United States Patent
Tomohiro et al.

(10) Patent No.: US 6,709,362 B2
(45) Date of Patent: Mar. 23, 2004

(54) ELECTRIC OIL PUMP CONTROL DEVICE

(75) Inventors: Tadasu Tomohiro, Toyota (JP); Yasuo Hojo, Nagoya (JP); Hideo Tomomatsu, Nagoya (JP); Yoshikazu Tanaka, Toyota (JP); Katsumi Nakatani, Nishikamo-gun (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/373,771

(22) Filed: Feb. 27, 2003

(65) Prior Publication Data

US 2003/0148850 A1 Aug. 7, 2003

Related U.S. Application Data

(63) Continuation of application No. PCT/JP01/07635, filed on Sep. 4, 2001.

(30) Foreign Application Priority Data

Sep. 5, 2000 (JP) ........................................ 2000-268081
Jun. 15, 2001 (JP) ........................................ 2001-181171

(51) Int. Cl.[7] .............................. B60R 1/02; H02P 1/00
(52) U.S. Cl. ................................ 477/3; 477/20; 477/97
(58) Field of Search .............................. 477/3, 15, 20, 477/97, 156; 701/53, 54, 57, 60, 65, 66

(56) References Cited

U.S. PATENT DOCUMENTS

| | | | | |
|---|---|---|---|---|
| 3,923,423 A | * | 12/1975 | Lauck | 417/3 |
| 4,531,485 A | * | 7/1985 | Murther | 123/196 S |
| 5,662,188 A | * | 9/1997 | Ito et al. | 184/6.3 |
| 5,944,632 A | * | 8/1999 | Hara et al. | 477/158 |
| 6,048,288 A | * | 4/2000 | Tsujii et al. | 477/5 |
| 6,253,739 B1 | * | 7/2001 | Golomb et al. | 123/509 |
| 6,321,697 B1 | * | 11/2001 | Matsuda et al. | 123/41.29 |
| 6,390,947 B1 | * | 5/2002 | Aoki et al. | 477/3 |
| 6,463,375 B2 | * | 10/2002 | Matsubara et al. | 701/54 |
| 6,482,127 B2 | * | 11/2002 | Katou | 477/192 |
| 6,556,910 B2 | * | 4/2003 | Suzuki et al. | 701/54 |

FOREIGN PATENT DOCUMENTS

| | | | |
|---|---|---|---|
| CA | 2 244 028 C | 7/2002 | |
| EP | 0 916 546 A2 | 5/1999 | |
| JP | A 52-76702 | 6/1977 | |
| JP | A 4-109028 | 4/1992 | |
| JP | 04140560 A | * 5/1992 | F16H/61/00 |
| JP | A 8-6110 | 3/1996 | |
| JP | A 11-147424 | 6/1999 | |
| JP | A 2000-46165 | 2/2000 | |
| JP | A 2000-199561 | 7/2000 | |
| JP | A 2000-227150 | 8/2000 | |
| JP | A 2000-230442 | 8/2000 | |
| JP | 2000356148 A | * 12/2000 | F02D/29/04 |
| JP | 2001041067 A | * 2/2001 | F02D/29/02 |
| JP | A 2001-193661 | 7/2001 | |

* cited by examiner

Primary Examiner—Tisha D Lewis
(74) Attorney, Agent, or Firm—Oliff & Berridge, PLC

(57) ABSTRACT

An electric oil pump capable of suppressing wear of an electric oil pump used as auxiliary to a main oil pump to thereby prolong the life of the pump and avoid any need to provide a larger pump. An electric oil pump (40) is operated only for a predetermined acceptable operation time, and the engine (12) is thereafter activated to cause the mechanical oil pump (36) to supply oil pressure. This arrangement can limit successive operating time for the electric oil pump (40), suppressing wear of the electric oil pump (40) and thus prolonging its life. Provision of a larger electric oil pump (40) can also be avoided.

4 Claims, 12 Drawing Sheets

US 6,709,362 B2

ELECTRIC OIL PUMP CONTROL DEVICE

This is a Continuation of Application No. PCT/JP01707635 filed Sep. 4. 2001. The entire disclosure of the prior application is hereby incorporated by reference herein in its entirety.

BACKGROUND OF THE INVENTION

1. Field of the Invention

The present invention relates to an electric oil pump control device for a vehicle, which effects activation and suspension of an operation of a driving source, such as an engine or a motor, while the vehicle is running.

2. Description of the Related Art

Conventional control devices capable of automatic activation and automatic suspension exist or have been proposed. These control devices automatically suspend operation of an engine under predetermined suspension conditions, such as when a running vehicle stops at a crossing or the like, and thereafter automatically activates the engine under predetermined activation conditions, such as when an accelerator pedal is depressed. Such control, generally referred to as eco-run control, is valuable for saving fuel and reducing emissions.

Motor vehicles are generally equipped with various kinds of hydraulic mechanisms, including an automatic hydraulic transmission, which operate utilizing oil pressure. Commonly, working oil pressure is supplied to these hydraulic mechanisms by means of a mechanical oil pump directly connected to a crank shaft of an engine. In vehicles adapted to the above-mentioned activation and suspension control, a second pump of an electric oil pump is additionally provided and used to continue oil supply when operation of the first mechanical oil pump is suspended accompanying suspension of engine operation, so that a hydraulic mechanism such as a transmission can operate without delay. Provision of a similar second pump is useful also for a hybrid vehicle in running using a motor-generator, which runs using, while switching, an engine and a motor-generator as a driving source, and also useful for an electric vehicle which runs using a motor-generator alone because operation of the motor-generator is generally suspended while the electric vehicle halts moving.

However, long term use of just a second pump alone for running of the vehicle may cause problems including accelerated deterioration of the pump and requirement for a larger second pump. These problems exist also when a main electric oil pump substituting for a first mechanical oil pump is used during switching.

The present invention has been conceived in view of the above, and suppresses deterioration of a second pump to thereby prolong the life of the pump and avoid need for a larger second pump.

SUMMARY OF THE INVENTION

According to the present invention, there is provided an electric oil pump control device, comprising a driving source; a driving source controller for activating and suspending operation of the driving source under predetermined condition; a first pump; a second pump driven by electrical energy; a pump controller for operating the second pump when the first pump is not operating; and a hydraulic mechanism driven by oil pressure supplied from the first pump and the second pump, wherein the pump controller causes the second pump to operate until a successive operating time of the second pump exceeds a predetermined acceptable operation time, and the driving source controller activates the driving source when the successive operating time of the second pump exceeds the acceptable operation time.

According the present invention, the pump controller controls the second pump so as to operate when the first pump is not operating, so that the hydraulic mechanism is driven by oil pressure supplied from the second pump when the first pump does not operate. Here, the pump controller controls the second pump to operate when the successive operating time of the second pump does not exceed a predetermined acceptable operation time, and the driving source controller activates the driving source when the successive operating time of the second pump exceeds the acceptable operation time. This arrangement limits the successive operating time of the second pump, thereby suppressing wear of the second pump and thus prolonging its life. Moreover, need for providing a larger second pump can be avoided.

According to the present invention, there is provided an electric oil pump control device, comprising a driving source; a driving source controller for activating and suspending operation of the driving source under a predetermined condition; a first pump; a second pump driven by electrical energy; a pump controller for operating the second pump when the first pump is not operating; and a hydraulic mechanism driven by oil pressure supplied from the first pump and the second pump, wherein the pump controller has the second pump to operate until a successive operating time of the second pump exceeds a predetermined acceptable operation time, and the acceptable operation time is set according to a measured value of physical property indicative of a state of the vehicle.

According to the present invention, there is provided an electric oil pump control device, comprising a driving source; a driving source controller for activating and suspending operation of the driving source under predetermined condition; a first pump; a second pump driven by electrical energy; a pump controller for operating the second pump when the first pump is not operating; a hydraulic mechanism driven by oil pressure supplied from the first pump and the second pump; and a prediction device for making running prediction according to a state of the vehicle, wherein the pump controller causes the second pump to operate until a successive operating time of the second pump exceeds a predetermined acceptable operation time, and the acceptable operation time is set according to the running prediction.

In the present invention, the running prediction may be based on a running state of the vehicle and a prediction concerning automatic activation of the driving source or a prediction concerning termination of operation of the vehicle.

DESCRIPTION OF THE PREFERRED EMBODIMENTS

In the following, preferred embodiments of the present invention, hereinafter referred to simply as embodiments, will be described with reference to the drawings.

Figure 1:
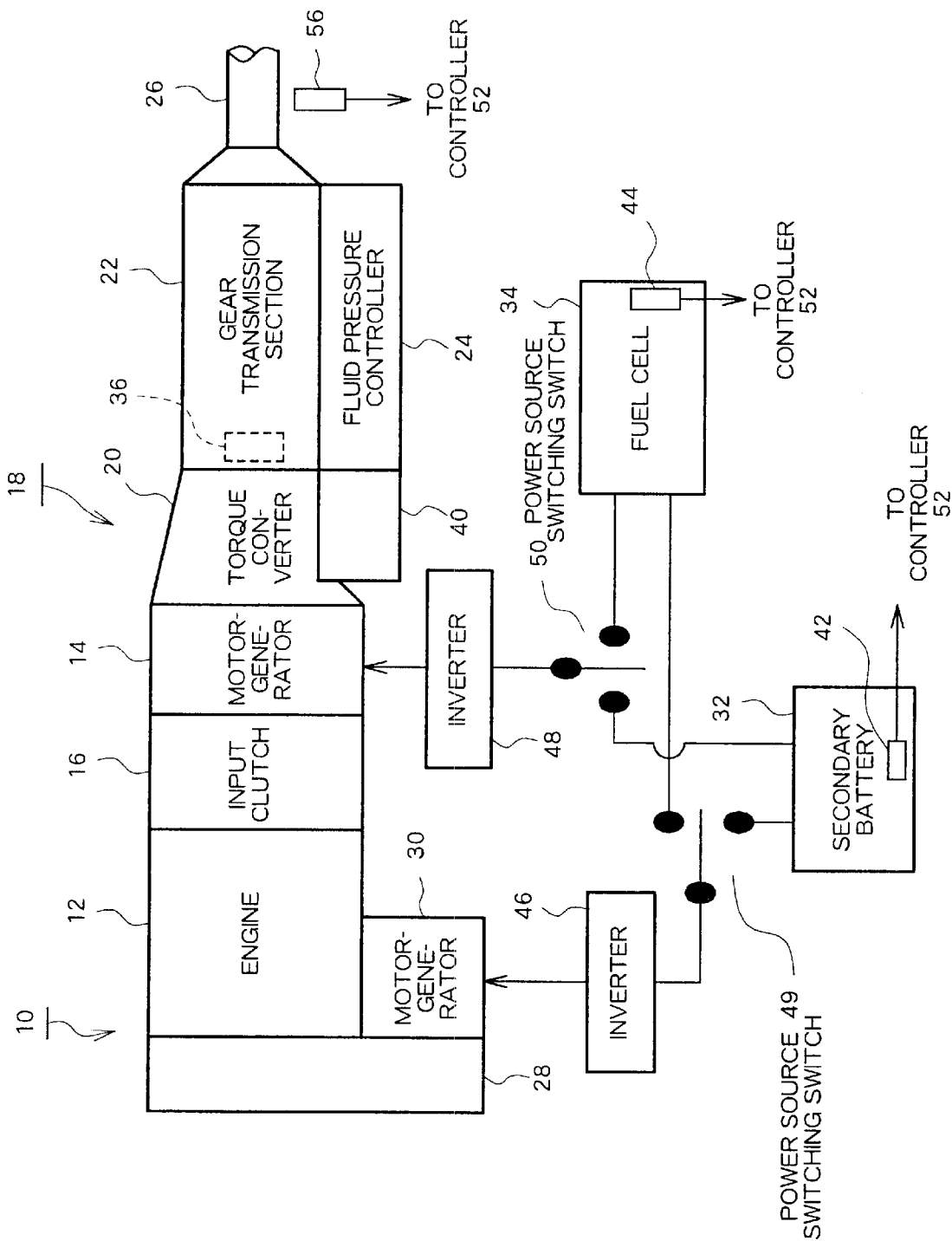
FIG. 1 is a block diagram showing schematic structure of a vehicle according to a first embodiment of the present invention.

FIG. 1 shows a schematic structure of a vehicle 10 according to a first embodiment. The vehicle 10 has an engine 12 and a motor-generator 14 which serve as driving sources, and controls so as to switch between them. The drive shaft of the engine 12 and the motor-generator 14 is connectable or disconnectable by means of an input clutch 16. The motor-generator 14 functions as a motor to drive the vehicle 10 when only a relatively small amount of output is required by a driver, such as when the accelerator is depressed by only a small amount or when the vehicle is running at a slower speed at which the engine would operate inefficiently. In addition, the motor-generator 14 functions as a generator driven by the engine 12 or through inertia of the vehicle 10 to charge the secondary battery 32 when the vehicle 10 is braking or when only a reduced amount of charge is left in the secondary battery 32. The input clutch 16 remains disconnected when the motor-generator 14 alone is used to drive the vehicle 10 for suppression of pump loss or friction loss with the engine 12.

Power from the engine 12 or the motor-generator 14 is transmitted to the automatic transmission 18, which comprises a fluid transmission mechanism, a gear transmission mechanism, and a control mechanism. In this embodiment, the fluid transmission mechanism is a torque converter 20 and has a direct connection function by means of a lock-up clutch, not shown. The gear transmission mechanism is a gear transmission section 22 which comprises a plurality of planet gear mechanisms. The gear transmission section 22 includes a clutch and a brake which both constrain movement of the respective elements constituting each planet gear mechanism. The clutch and brake are controlled through selective supply of a working fluid from a fluid pressure controller 24 serving as a control mechanism. An output from the gear transmission section 22 is transmitted to a driving wheel through a propeller shaft 26. The gear transmission section 22 incorporates a mechanical oil pump 36, which is brought into direct, mechanical connection to the drive shaft of either the engine 12 or the motor-generator 14 while the input clutch 16 and the torque converter 20 are connected.

An auxiliary motor-generator 30 is additionally provided, connected to the drive shaft of the engine 12 via a power transmission mechanism 28. The power transmission mechanism 28 may be a gear array or a flexible member such as a belt or chain. The auxiliary motor-generator 30 may be a synchronous electric motor which functions as a generator while the engine 12 is being operating, to charge a secondary battery 32 which feeds power to engine accessories and electric accessories mounted to the vehicle and to feed power directly to the electric accessories or the like. Additionally, the auxiliary motor-generator 30 functions as a motor, powered by the secondary battery 32 or a fuel cell 34, at activation of the engine 12.

The automatic transmission 18 commonly uses Automatic Transmission Fluid, or ATF, as a lubricating fluid throughout the whole automatic transmission 18, a working fluid via which to transmit power from the torque converter 20, and a working fluid for operating a clutch and a brake in the gear transmission section 22. ATF is supplied from the mechanical oil pump 36 through the fluid pressure controller 24 to the respective elements of the automatic transmission 18 and the torque converter 20.

The mechanical oil pump 36 is installed on the follower side relative to the torque converter 20 which is driven by the engine 12 or the motor-generator 14. Therefore, the mechanical oil pump 36 may be unable to produce sufficient output such as when the vehicle 10 remains stopped or runs at a very low speed as being driven by the motor-generator 14 alone. In order to cope with such a case, the vehicle 10 is equipped with an electric oil pump 40 which operates with power from a motor, not shown. Operation of the electric oil pump 40 is controlled by a controller 52, described below, depending on the running state of the vehicle.

Figure 2:
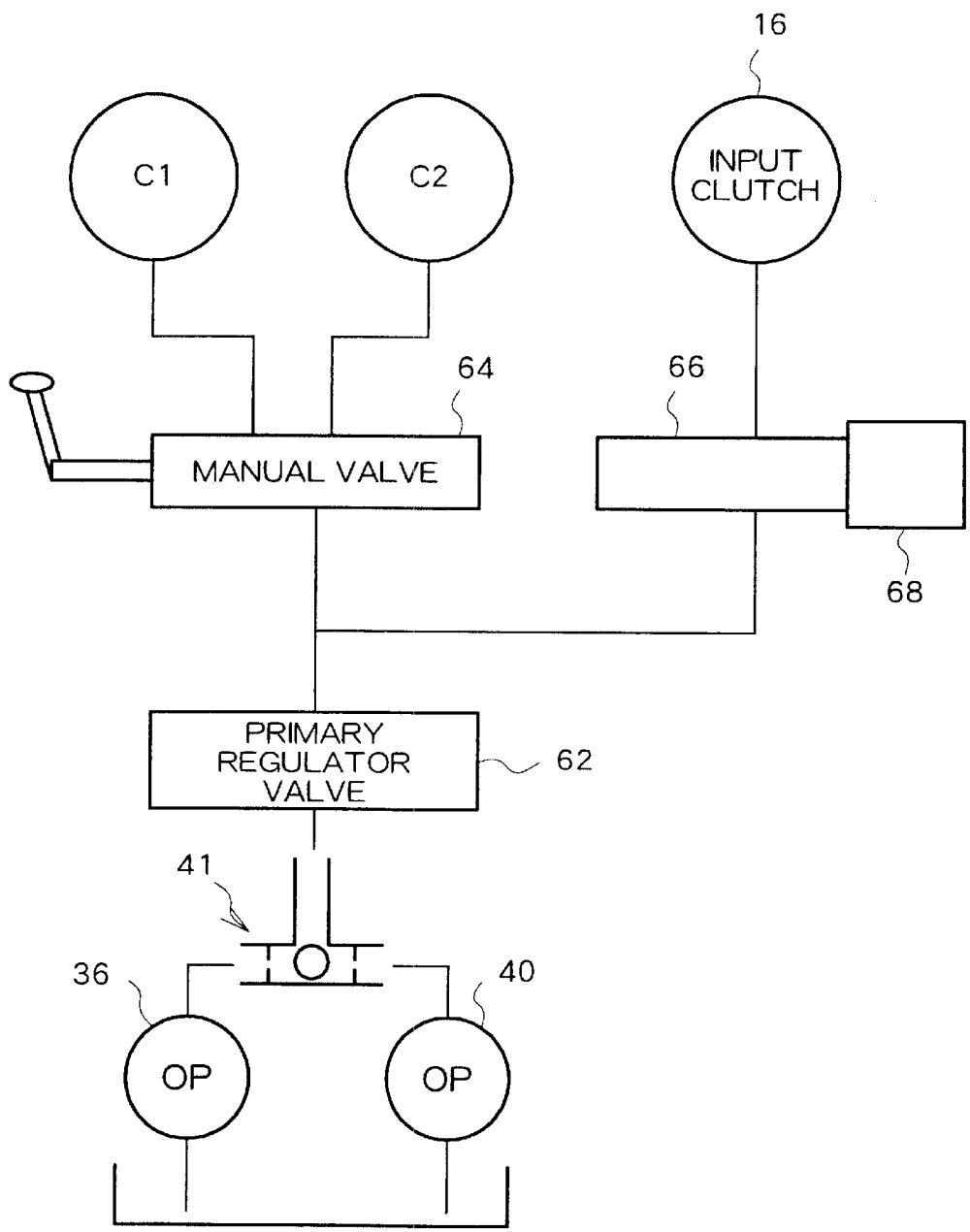
FIG. 2 is a block diagram showing an oil pressure circuit installed on the output side of a mechanical oil pump and an electric oil pump.

Output sides of the mechanical oil pump 36 and the electric oil pump 40 are both connected to a switching check ball mechanism 41, as shown in FIG. 2. ATF supplied from one pump produces pressure to cause the check ball to stem the other supply hole to thereby switch the oil pressure supply sources. The output side of the switching check ball mechanism 41 is connected via a primary regulator valve 62 to a manual valve 64 and an input clutch control valve 66. The output side of the manual valve 64 is in turn connected to a forward clutch C1 and a backward clutch C1 within the automatic transmission 18. The manual valve 64 can be controlled from the passenger cabin via a shift lever. The output side of the input clutch control valve 66 is connected to the input clutch 16, the input clutch control valve 66 being operable through an input clutch control solenoid 68.

In the example of this embodiment, two power sources, the secondary battery 32 and the fuel cell 34, are used. The secondary battery 32 and the fuel cell 34 are connected to the motor-generator 14 though the power source switching switch 50 and the inverter 48 and to the auxiliary motor-generator 30 through the power source switching switch 49 and the inverter 46. The power source switching switches 49, 50 independently operate in response to an output from the controller 52, described below, so that the secondary battery 32 or the fuel cell 34 can selectively feed power to the motor-generator 14 and the auxiliary motor-generator 30. The secondary battery 32 has an SOC sensor 42 for detecting its state of charge, or SOC. The fuel cell 34 has a remaining amount sensor 44 for detecting an amount of fuel remaining therein.

The automatic transmission 18 has control positions, including a D-position for automatic selection of the most appropriate step from among the respective transmission steps for forward progression, a 2-position and an L-position for selecting an appropriate step from limited transmission steps, an N-position for placing the gear transmission section 22 in a neutral position in which no driving force is transmitted, an R-position for selecting reverse, a P-position for mechanically locking the output side of the gear transmission section 22 so that the vehicle 10 is unable to move. This apparatus additionally comprises a manual transmission mode for allowing the driver to select a transmission step. In the manual transmission mode, the driver is able to shift the transmission gearing up or down in stages by operating a shift lever or switch A navigation section comprises a current location sensing section, a map information storage section, and a route guidance section, all not shown. The current location sensing section includes a Global Positioning System, or GPS, receiver which calculates a vehicle location through use of signals received from earth-orbiting satellites, a beacon receiver for receiving location information from a beacon installed along a road, a direction sensor, and a distance sensor. The GPS receiver and the beacon receiver are used for locating the vehicle in an area where receipt of information by these is possible, while inferential navigation is applied using direction and distance sensors in an area where the signals cannot be received. The map information storage section stores map data, road data, and destination data so that route search can be performed using the road and destination data. Road data may concern the width and length of each road, a coordinate position (latitude and longitude) at each point and the name and coordinate position of each crossing located between start and end points of each road, and so forth. A signal from the navigation section is supplied to a controller 52.

A controller 52 is provided for controlling the respective sections of the vehicle 10. The controller 52 is configured in the form of a one-chip microprocessor with the CPU serving as a main element and comprises a ROM for storing process programs, a RAM for temporarily storing data, a communication port, and input and output ports, all not shown.

Figure 3:
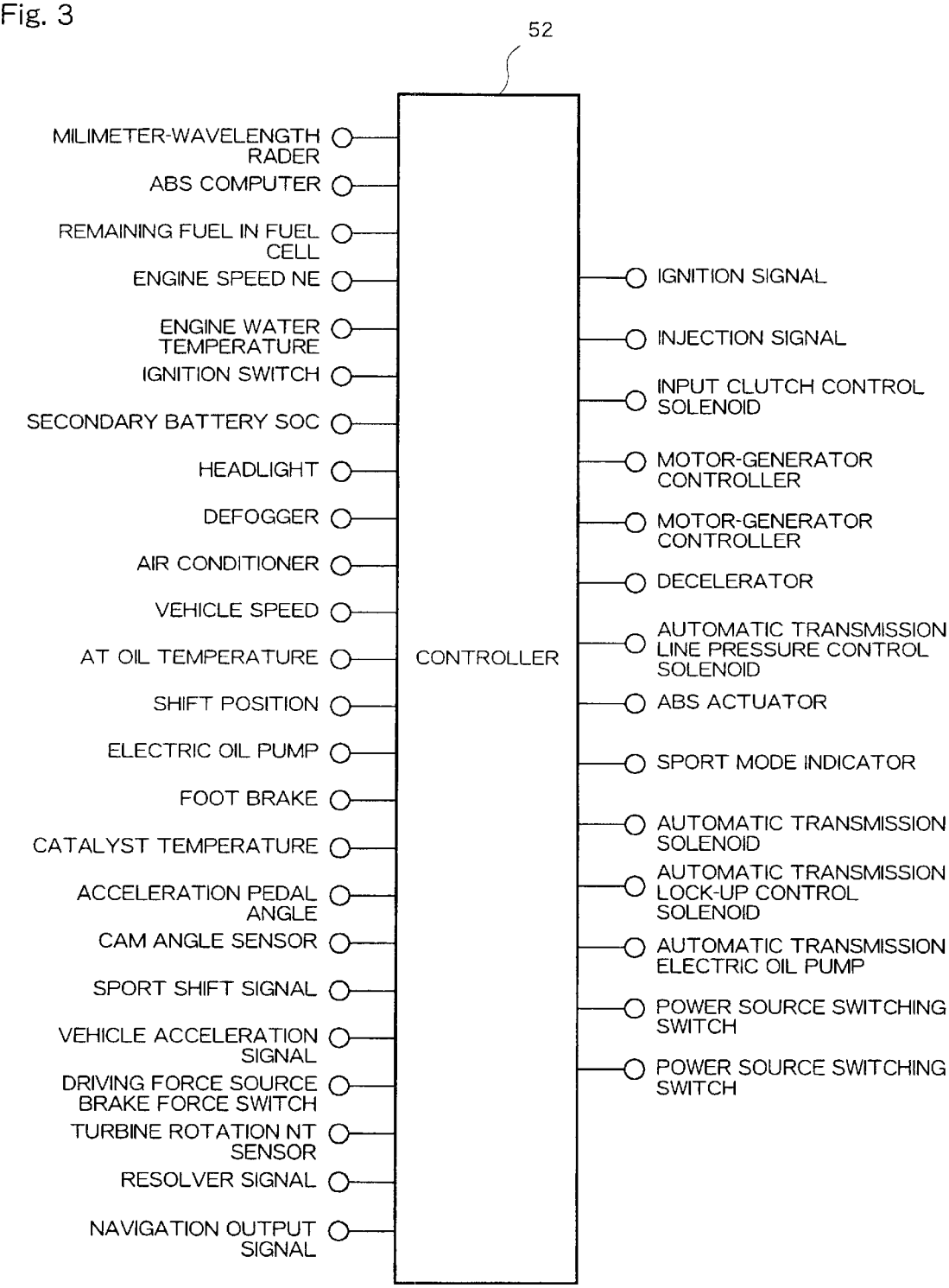
FIG. 3 is a block diagram showing types of input/output signals with respect to a controller.

As shown in FIG. 3, the controller 52 receives various signals indicating physical property of the state of the vehicle 10. Specifically, the signals include a detection signal from a millimeter-wavelength radar installed at the leading end of the vehicle 10 for detecting proximity to a preceding vehicle, an output signal from an Antilock Brake System, or ABS, computer for controlling the ABS, a detection signal from a remaining amount sensor 44 for detecting an amount of fuel remaining in the fuel cell 34, a detection signal from an engine speed sensor for detecting rotation of the engine, a detection signal from an engine water temperature sensor, a detection signal from an ignition switch for controlling activation and suspension of operation of the vehicle 10, a detection signal from an SOC sensor 42 provided to the secondary battery 32, detection signals for detecting various operation states of a head light, a defogger, and an air conditioner, a detection signal from a vehicle speed sensor 56, a detection signal from an oil temperature sensor provided to a fluid pressure controller 24, a detection signal from a shift position sensor, a detection signal indicative of an operation state of the electric oil pump 40, a detection signal from an angle sensor mounted to a foot brake pedal, a detection signal from a catalyst temperature sensor installed into an exhaustion pipe, a detection signal from an angle sensor mounted to an acceleration pedal, a detection signal from a cam angle sensor mounted to a cam shaft of the engine 12, a detection signal from a sport mode switch provided in the vicinity of a shift lever, a detection signal from a vehicle acceleration sensor, a detection signal from a driving force source brake force switch mounted to the engine 12, a detection signal from a turbine speed sensor, a detection signal from a resolver, an output signal from the above-described navigation section, and so forth. Based on these input signals, the controller 52 conducts various operations.

The controller 52 in turn outputs various control signals to various actuators and other computers mounted to the vehicle 10. Specifically, the signals may include an ignition signal to an ignition timing controller, an injection signal to a fuel injection system, a control signal to a control solenoid of the input clutch 16, control signals to the respective controllers for controlling the motor-generator 14 and the auxiliary motor-generator 30, a control signal to a decelerator, a control signal to a line pressure control solenoid of the automatic transmission 18, a control signal to an actuator of the above-mentioned ABS, a control signal to a sport mode indicator which indicates an operation state in association with the above-mentioned sport mode switch, control signals to the respective solenoids of the automatic transmission 18, a control signal to a lock-up control solenoid which controls lock-up of the automatic transmission 18, a control signal to the electric oil pump 40, control signals to the power source switching switches 49, 50, and so forth.

In the following, control performed in a vehicle 10 having the above-described example structure according to the first embodiment of the present invention will be described.

Figure 4:
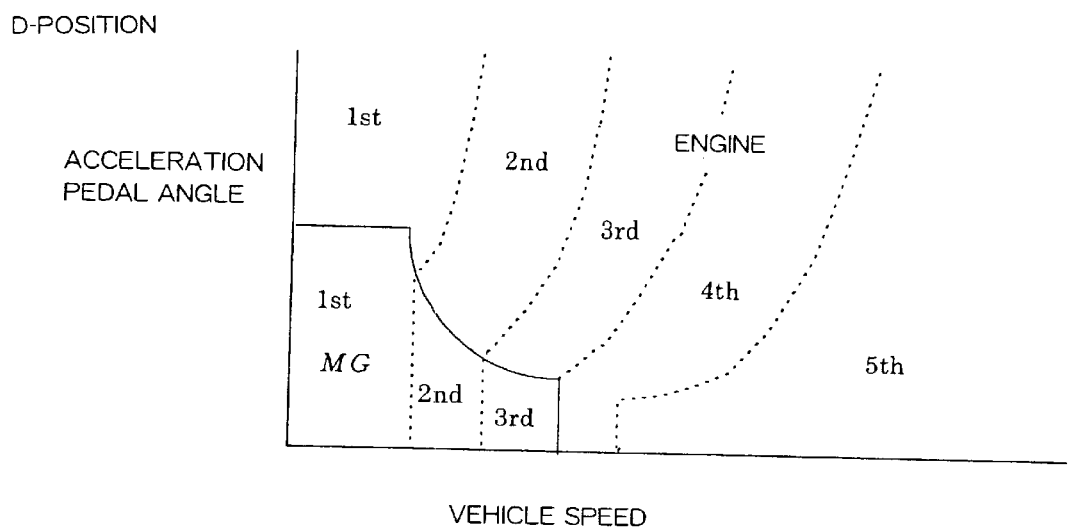
FIG. 4 is a graph showing regions in use of the engine and the motor-generator.

The vehicle 10 applies driving source switching control, as described above. That is, as shown in FIG. 4, when an acceleration pedal angle (accelerator input) and a vehicle speed are both small, such as when the vehicle 10 is idling or running at a low speed, the motor-generator 14 functions as a motor so that the vehicle 10 runs with a power from the motor-generator 14. When the acceleration pedal angle and vehicle speed are both large, such as when the vehicle 10 is running under a heavy load due to acceleration or hill-climbing, for example, the engine 12 is automatically activated so that the vehicle 10 runs with a power from the engine 12. Here, it should be noted that the setting shown in FIG. 4 is associated with the automatic transmission 18 placed in D-position, and that other settings are applied for other positions.

In addition, the motor-generator 14 functions as a generator to recharge electric power to the secondary battery 32 when the vehicle decelerates or brakes. When the SOC of the secondary battery 32 drops, the secondary battery 32 is charged either by electric power from the fuel cell 34 or by electric power from the motor-generator 14 which converts the power-upped engine output energy to electric power.

In association with the driving source switching control, the electric oil pump 40 is provided with activation and suspension control. Specifically, for running with power from the motor-generator 14 alone, the electric oil pump 40 is activated, when the vehicle 10 stops running or runs at a very slow speed, for continuation of oil pressure supply to a hydraulic mechanism including the automatic transmission 18. For running with power from the engine 12, on the other hand, operation of the electric oil pump 40 is suspended because the mechanical oil pump 36 is activated upon activation of the engine 12.

Figure 5:
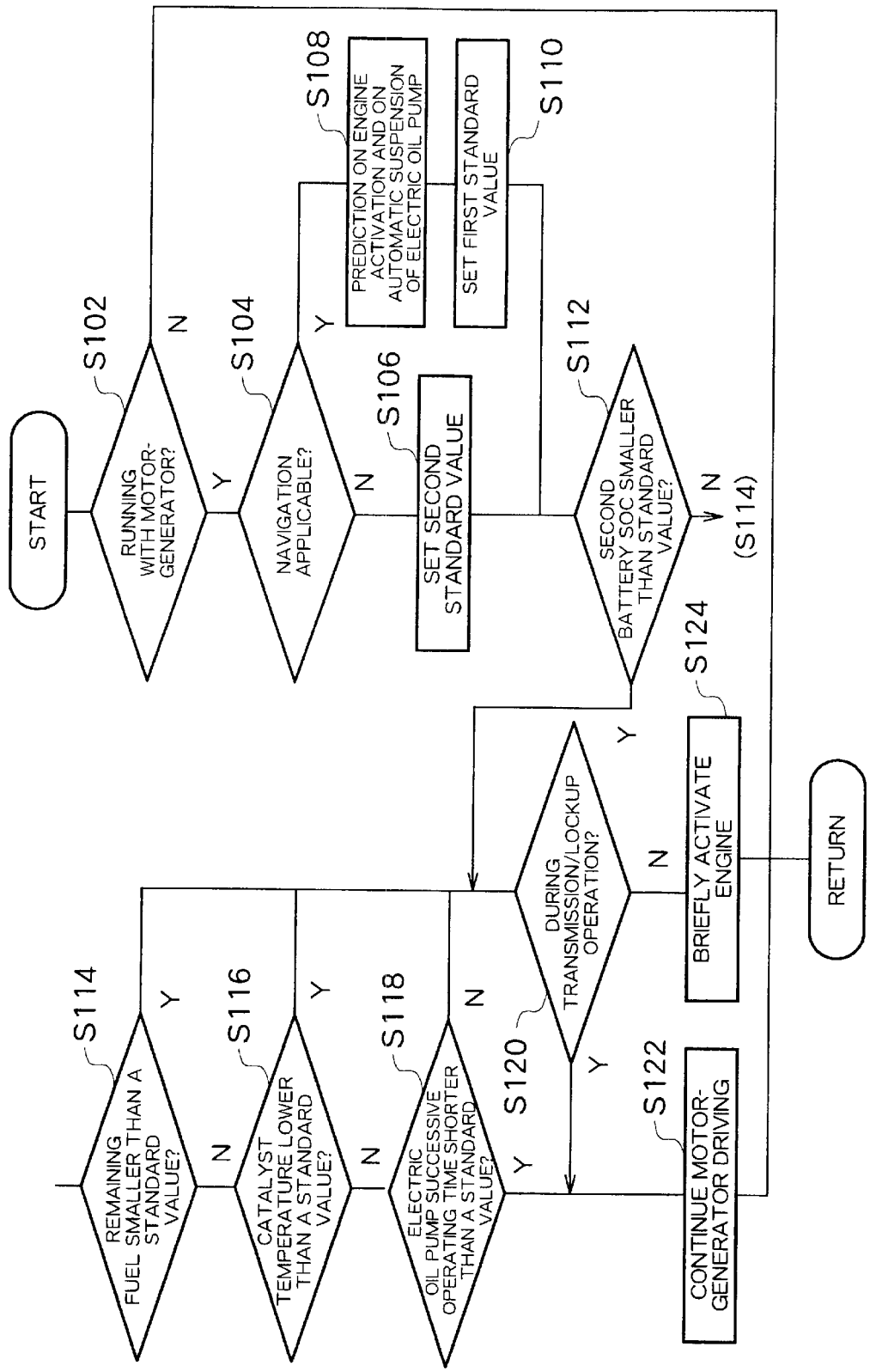
FIG. 5 is a flowchart of control in the first embodiment.

With this vehicle 10, an acceptable operation time for the electric oil pump 40 is set through the following control. Referring to FIG. 5, whether or not the vehicle 10 currently runs with power from the motor-generator 14 is determined (S102). This determination is performed because the mechanical oil pump 36 operates when the vehicle is stopped, while the engine 12 is rotating under a predetermined idling speed. But, the mechanical oil pump 36 does not operate when the vehicle 10 is stopped while the motor-generator 14 is used for running. When the motor-generator 14 then stops operating, the electric oil pump 40 is utilized. Therefore, supposing that the vehicle 10 is in the latter case, the control for the electric oil pump being described here may be necessary. The determination at S102 may be made based on detection signals from the engine speed sensor and the vehicle speed sensor 56. Alternatively, a control signal to the motor-generator 14 may be relied on. When the determination is negative, this process routine is terminated.

When the determination is positive, on the other hand, whether or not a navigation can be applicable is next determined, where a navigation is determined to be applicable when a running prediction concerning reactivation of the engine 12 by other factors can be made based on a running state (S104). This determination is made based on whether or not an effective running prediction described later can be made. When the determination is negative, a relatively short second standard value, for example, seven minutes, is set as an acceptable operation time for the electric oil pump 40 (S106).

When the determination at S104 is positive, on the other hand, a running prediction is made based on a running state (S108). This running prediction concerns a timing at which to automatically suspend the operation of the electric oil pump 40 through other control, including the following two situations.

A first situation involves a case wherein the electric oil pump 40 is automatically suspended following automatic activation of the engine to be applied to handle heavily loaded driving such as hill climbing or acceleration. Specifically, when such a prediction is made, based on the present location of the vehicle relative to the destination and the current vehicle speed, that the vehicle will enter a highway or a vehicle-only-road in a few minutes and therefore undergo high-speed and heavily-loaded driving, the time left before that event is calculated.

A second situation involves a case wherein the electric oil pump 40 is suspended following stop of driving the vehicle 10 due to termination of using the vehicle 10. Specifically, when such a prediction is made, based on the present location of the vehicle relative to the destination and the current vehicle speed, that the vehicle 10 will reach the destination in a few minutes and therefore running will stop, the time left before that event is calculated.

After such a running prediction is made, a relatively long first standard value, for example, nine minutes, is set as an acceptable operation time for the electric oil pump 40 (S110).

Figure 6:
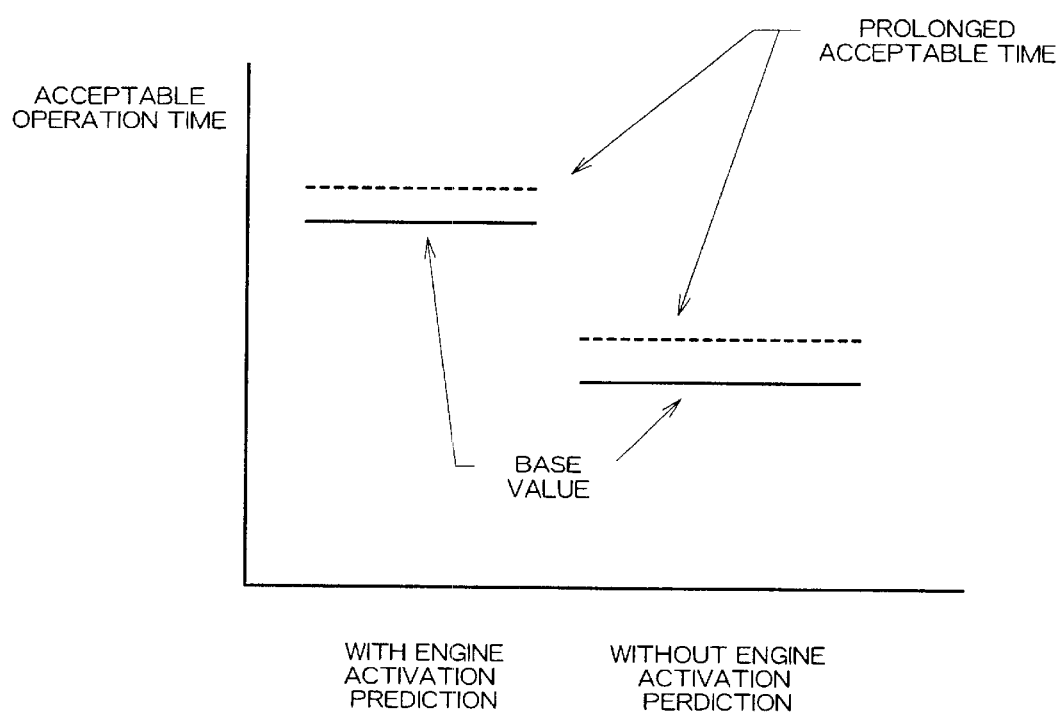
FIG. 6 is a graph showing an example setting of an acceptable operation time.

It should be noted that an acceptable operation time to be set at S106 and S110 includes a base value and a constant prolonged acceptable time, as shown in FIG. 6. A prolonged acceptable time is a time period within which operation of the electric oil pump 40 is continued even after the lapse of a period of time corresponding to a base value in the case where a period of time left before the expected automatic suspension of the electric oil pump 40 is shorter than the prolonged acceptable time. This arrangement reduces frequency of brief activating of the engine 12, and thus achieves further reduction of fuel consumption. In addition, because continuation of operation of the electric oil pump 40 is limited to a case where the period of time left before the expected automatic suspension is effected is shorter than a prolonged acceptable time, wear of the electric oil pump 40 can be suppressed.

Subsequently, whether or not the SOC of the secondary battery 32 is equal to or less than a predetermined standard value is determined (S112), and then whether or not an amount of fuel remaining in the fuel cell 34 is equal to or less than a predetermined standard value is determined (S114). When at least one of the two determinations is positive, namely, when either the SOC of the secondary battery 32 is low or only a smaller amount of fuel is left in the fuel cell 34, the engine 12 is briefly activated (S124). The brief activation of the engine 12 is applied in order to charge the secondary battery 32 because charging the secondary battery 32 by the fuel cell 34 through the above-noted control cannot be expected when the SOC of the secondary battery 32 is small and only a small amount of fuel remains in the fuel cell 34.

When the determination at S114 is negative, that is, when the amount of fuel remaining in the fuel cell 34 is larger than a standard value, whether or not a catalyst temperature, which is obtainable based on a signal from the catalyst temperature sensor, is equal to or lower than a standard value is then determined (S116). When the determination is positive, the engine 12 is briefly activated (S124) in order to prevent deterioration of the capacity of cleaning exhausted gas due to a dropped catalyst temperature.

It should be noted that a timing for the brief activation of the engine 12 based on a catalyst temperature can be changed by changing a standard catalyst temperature value depending on a running prediction based on a running state. This running prediction concerns a timing at which an operating state of the engine 12 is varied based on other factors, including the following two situations.

A first situation relates to automatic activation of the engine 12 to be applied to handle a heavily loaded driving such as acceleration or climbing a hill. Specifically, when such a prediction is made, based on the present location of the vehicle relative to the destination and the current vehicle speed, that the vehicle will enter a highway or a vehicle-only-road in a few minutes and therefore undergo high-speed and heavily-loaded driving, the time left before that event is calculated.

A second situation relates to suspension of the engine 12 following stop of driving the vehicle 10 due to termination of using the vehicle 10. Specifically, when such a prediction is made, based on the present location of the vehicle relative to the destination and the current vehicle speed, that the vehicle 10 will reach the destination in a few minutes and therefore be stopped running, the time left before that event is calculated.

Figure 7:
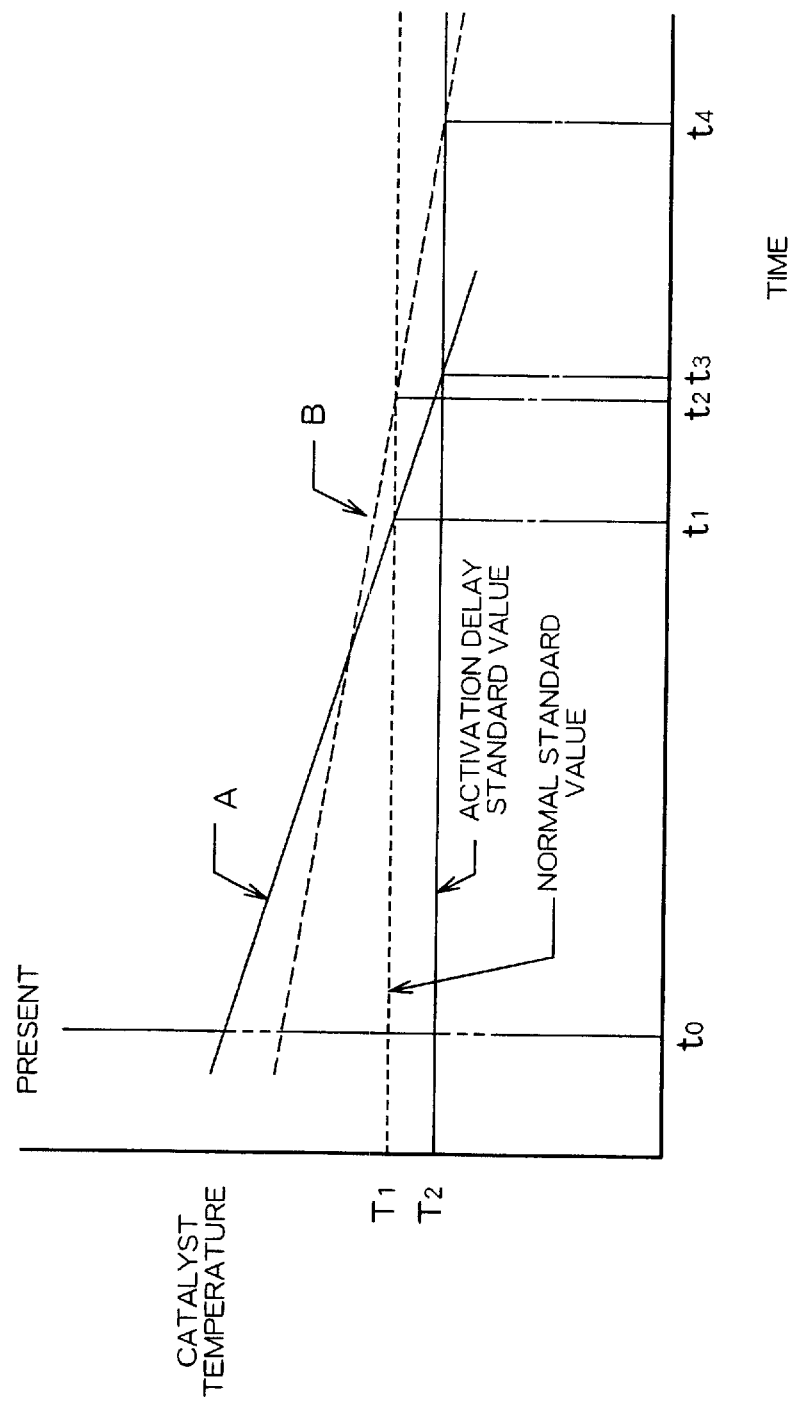
FIG. 7 is a time chart showing an example setting of a standard value for brief engine activation control based on a catalyst temperature.

After such a running prediction is made, the calculated period of time before automatic activation of the engine 12 or termination of driving the vehicle 10 is compared with a predetermined standard time. As shown in FIG. 7, when the calculated time is less than the standard time, a smaller activation delay standard value T2 is set in the place of a normal standard value T1 as a standard value for brief activation of the engine 12 based on a catalyst temperature. As a result, provided that the catalyst temperature varies as indicated by the solid line A in FIG. 7, brief activation of the engine 12 based on a catalyst temperature is applied at t3 for an activation delay standard value T2, as opposed to at t1 for a normal standard value T1. That is, a timing for the brief activation is delayed. It should be noted that the above mentioned structure in which a smaller standard value is set whereby a timing for automatic activation of the engine 12 is delayed may be substituted by another structure in which a predetermined delay time is added at t1 in FIG. 7, instead of changing the standard value, so that the engine 12 is briefly activated after the lapse of the added delay time.

Thereafter, a period of time in which the electric oil pump 40 has been successively operating, or a successive operating time, is compared with the acceptable operation times for the electric oil pump 40 (first and second standard values), which are previously set at S106 and S110 (S118). When the successive operating time is within the acceptable operation time, a positive determination is made and driving with power from the motor-generator 14 is continued, so that supply of oil pressure by the electric oil pump 40 is continued.

It should be noted that, when determination which requires brief activation of the engine 12 is made at S112, S114, S116, and S118, whether or not the automatic transmission 18 is in the process of a transmitting operation and whether or not the lock-up mechanism in the torque converter 20 is in the process of switching the lock-up mechanisms is determined at S120. When at least one of these two determinations is positive, brief activation of the engine 12 is restrained and driving with power from the motor-generator 14 is continued (S122) in order to prevent variation of supplied oil pressure during operation of these hydraulic mechanisms. For the same reason, whether or not hydraulic mechanisms of any other types which prefer no variation of supplied oil pressure during their operation are in the process of their respective operations may be determined at S120.

The duration of brief activation of the engine 12 at S124 may vary according to circumstances because a required period of time with the engine 12 remaining activated may differ depending on the purpose of the activation, such as charging the secondary battery 32, maintaining a catalyst temperature, reducing an operating time of the electric oil pump 40, and so forth.

As described above, in this embodiment, the electric oil pump 40 is allowed to operate only within a predetermined acceptable operation time. This can limit a successive operating time of the electric oil pump 40, and resultantly suppress wearing of the electric oil pump 40. As a result, the life of the electric oil pump 40 can be prolonged. Moreover, provision of a larger electric oil pump 40 can be avoided.

Further, with the configuration of this embodiment, the engine 12 is activated when the successive operating time of the electric oil pump 40 exceeds a predetermined acceptable operation time. Accordingly, the mechanical oil pump 36 is activated after suspension of the electric oil pump 40, so that supply of oil pressure is continued.

Still further, because in this embodiment, an acceptable operation time for the electric oil pump 40 is set according to a running state, the electric oil pump 40 can continue to operate when the vehicle is in such a running state that prefers no pump switching. As a result, drivability can be improved.

Yet further, in this embodiment, an acceptable operation time is set according to a running prediction. This makes it possible to delay brief activation of the engine 12 according to a running prediction. As a result, fuel consumption can be improved.

Although the running prediction utilized in setting an acceptable operation time concerns a timing at which to automatically suspend the electric oil pump 40 through the above-described control in this embodiment (S106, S110), the setting may be based on other types of running prediction.

For example, a running prediction concerning a successive operating time of the engine 12 after reactivation may base the setting of an acceptable operation time of the electric oil pump 40. Specifically, a relatively long acceptable operation time may be set for the electric oil pump 40 upon prediction of a relatively long successive operating time of the engine 12 to follow after reactivation.

Alternatively, a running prediction concerning a successive suspending time of the electric oil pump 40 may base the setting of an acceptable operation time of the electric oil pump 40. Specifically, a relatively long acceptable operation time may be set for the electric oil pump 40 upon prediction of a relatively long successive suspending time of the electric oil pump 40 to follow.

These arrangements are possible when the electric oil pump 40 can be expected to operate for a relatively long time without damage when a relatively long rest time can be expected to follow.

Further, although the timing for brief activation of the engine 12 based on a catalyst temperature is changed based on a running prediction in the example illustrating this embodiment (S116), other structures may be provided instead, or additionally, such as a structure in which the timing is changed depending on a dropping or changing rate of the catalyst temperature. An example structure may determine a slow dropping rate, that is, a high ambient temperature, when an absolute value of the gradient of a changing catalyst temperature in the immediate past is equal to or smaller than a predetermined value, and delays a timing for reactivation of the engine 12. This structure relies on an assumption that the catalyst temperature can recover swiftly at a high ambient temperature. The determination may be made based on a detection signal from an outside temperature sensor desirably installed to the vehicle 10.

Specifically, a general standard value T1 may be used as a standard value for brief activation of the engine 12 based on a catalyst temperature in the case of the solid line A in FIG. 7, which represents falling of a catalyst temperature at a higher rate. On the other hand, an activation delay standard value T2 may be used in the case of the broken line B in FIG. 7, which represents falling of a catalyst temperature at a lower rate, as a higher ambient temperature is assumed in this case and therefore swift recovery of the catalyst temperature is expected. As a result, the timing for brief activation of the engine 12 based on a catalyst temperature is delayed to t4, as opposed to t2 for a general standard value T1. As described above, a timing for brief activation of the engine 12 based on a catalyst temperature can be delayed, so that fuel consumption can be improved.

It should be noted that although two standard values are used for the brief activation of the engine 12 in the above, a greater number of standard values may be employed. Alternatively, a different standard value may be obtained through calculation using a linear function depending on a dropping rate of a catalyst temperature.

In the following, a second embodiment will be described with reference to FIGS. 8 to 12. In this embodiment, a vehicle 110 performs automatic reactivation and automatic suspension of an engine 112 according to a state of the vehicle 110 (hereinafter referred to as eco-run control). With this vehicle 110, a successive operating time of the electric oil pump 140 is changed based on an accumulated operation time of the electric oil pump 140.

Figure 8:
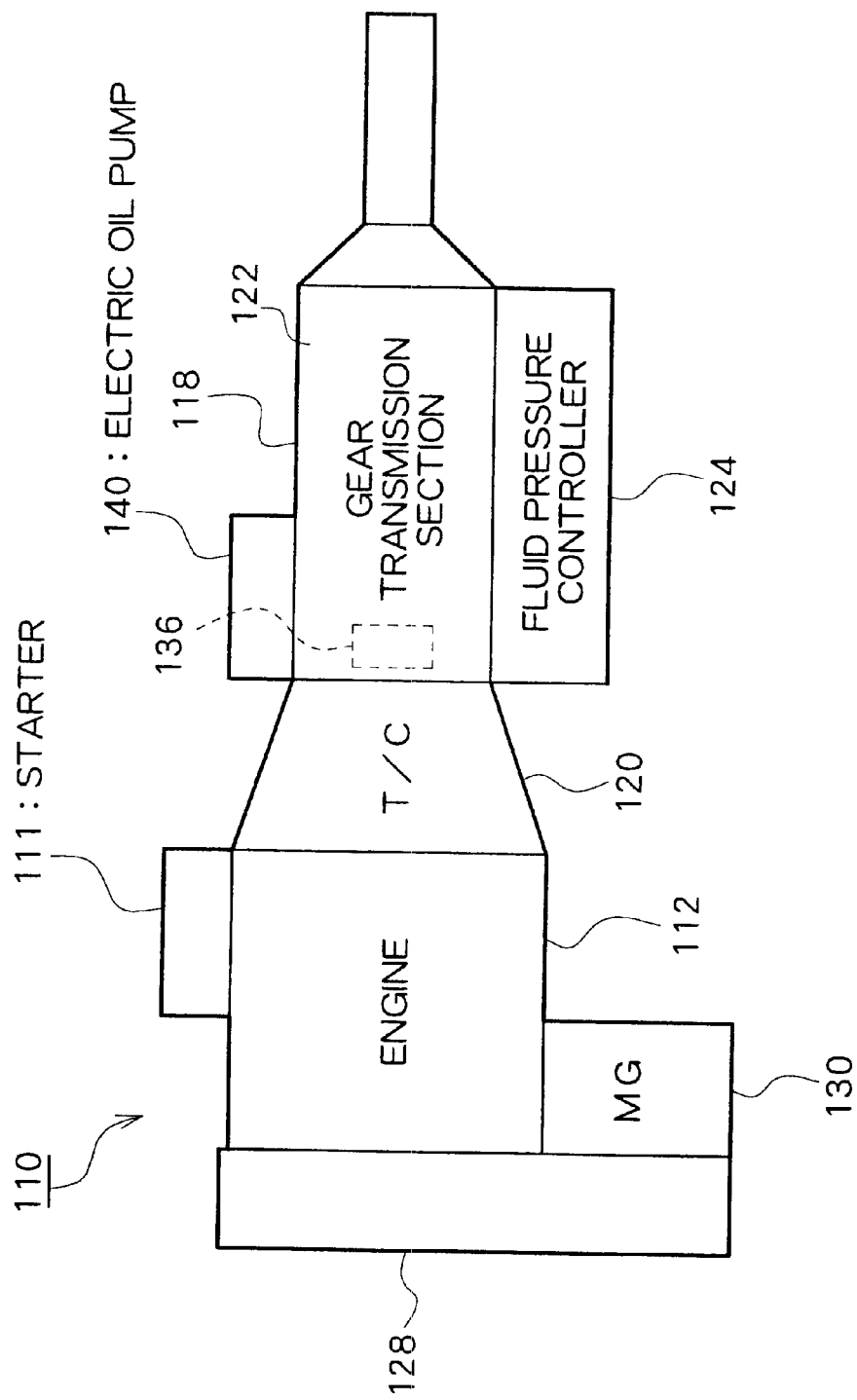
FIG. 8 is a block diagram showing a schematic structure of a vehicle according to a second embodiment of the present invention.

Referring to FIG. 8, an engine 112 is connected to a starter 111 which can activate the engine 112, and further to an auxiliary motor-generator 130 via a power transmission mechanism 128, which can activate the connected engine 112 and also function as a generator. The power transmission mechanism 128 may be a gear array or a flexible member, such as a belt or chain.

The auxiliary motor-generator 130 may be a synchronous electric motor, and may be used in place of the starter 111 when reactivating the engine 112 while eco-run control, described later, is being applied. The auxiliary motor-generator 130 also regenerates power while the engine 112 is being braked. Further, the auxiliary motor-generator 130 functions as a motor while the engine 112 remains not operating, driving the accessories including an air conditioner compressor, a water pump, a power steering pump, all not shown, and so forth, in a situation wherein power transmission to the engine 112 through the power transmission mechanism 128 is disconnected. The auxiliary motor-generator 130 is connected to a secondary battery via a relay, not shown, and activated in response to a control output to the relay from the controller 152, as described below.

The engine 112 is an internal combustion engine using gasoline as fuel. The engine 112 has a fuel injection system, not shown, for direct injection of fuel to a combustion chamber, not shown, and a throttle actuator for opening or closing a throttle valve installed to an inlet pipe of the engine 112. Through control of a period of time with the valve of the fuel injection system remaining open and of opening of the throttle valve, driving state is controlled. The drive shaft of the engine 112 is directly connected to a mechanical oil pump 136 via a torque converter 120.

The automatic transmission 118 comprises a torque converter 120, a gear transmission section 122, and a fluid pressure controller 124 for controlling the gear transmission section 122. The automatic transmission 118 automatically selects a gear ratio according to a running state. A gear ratio may also be selected according to an operation state of a shift lever, not shown, installed in the interior of the vehicle room.

In this embodiment, an electric oil pump 140 is provided in addition to the above-described mechanical oil pump 136. The electric oil pump 140 is installed in the vicinity of the gear transmission section 122. A driving motor, not shown, of the electric oil pump 140 is connected to a secondary battery through a relay, not shown, and activated in response to a control output to the relay from a controller 152, described later. It should be noted that the electric oil pump 140 has a smaller capacity than that of the mechanical oil pump 136, and is designed to be adapted to lower pressure and a smaller fluid amount for reduction of size and power consumption.

The electric oil pump 140 and the mechanical oil pump 136 are connected to an oil pressure control circuit which is provided inside of the gear transmission section 122 and controls operation of the gear transmission section 122. The oil pressure control circuit includes an oil pressure path 131, as shown in FIG. 9, through which oil pressure is transmitted to a forward clutch C1 which is brought into engagement for progression.

Figure 9:
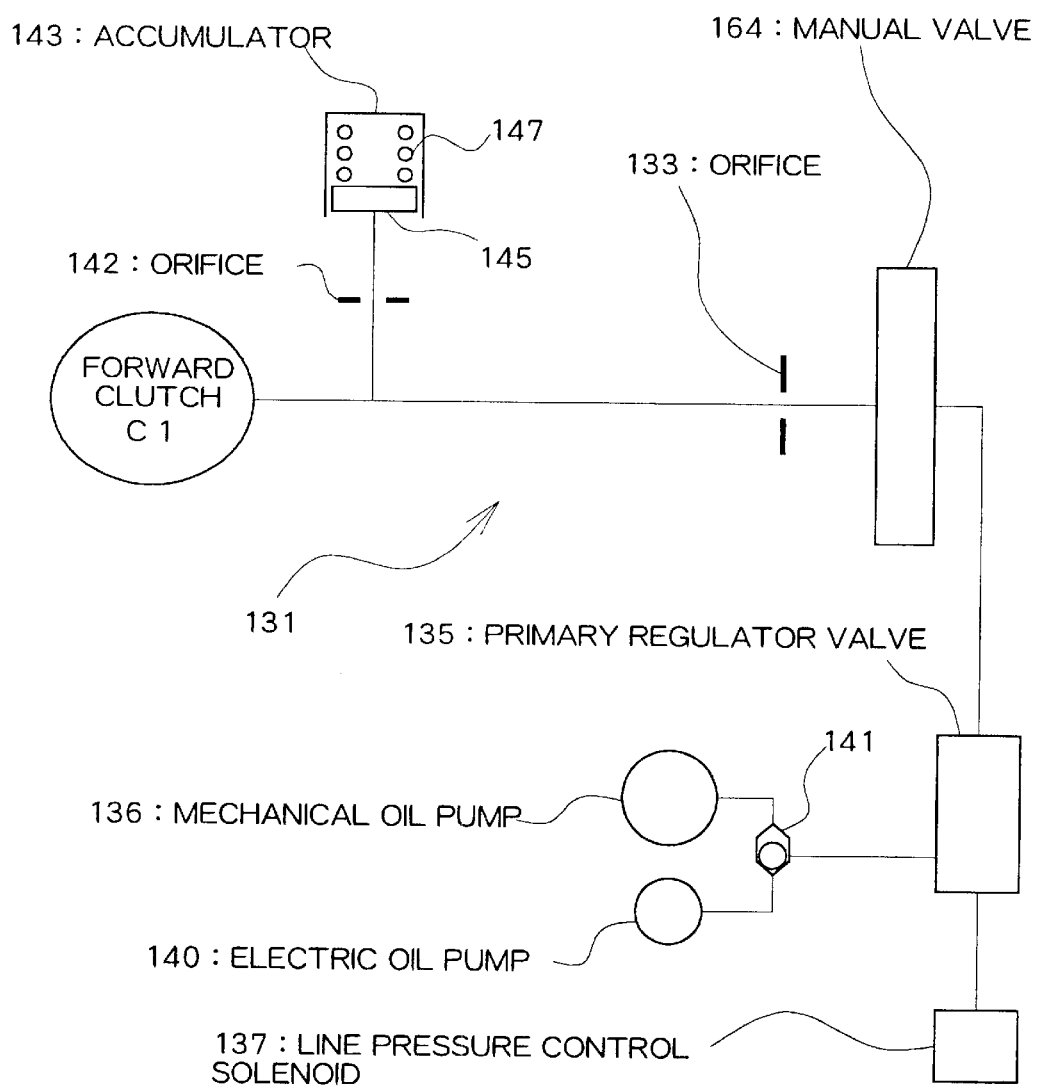
FIG. 9 is a diagram showing a portion of the structure of a hydraulic control circuit.

Referring to FIG. 9, in the oil pressure path 131, an electric oil pump 140 and a mechanical oil pump 136 are connected to a primary regulator valve 135 in a manner such that they diverged therefrom via a switching check ball mechanism 141. ATF supplied from one pump creates a pressure which causes the check ball to stem the supply hole of the other pump, to thereby switch the supply sources. Oil pressure at the primary regulator valve 135 is adjusted by an AT line pressure control solenoid 137. The output side of the primary regulator valve 135 is connected to the forward clutch C1 through the manual valve 164 for transmitting the line pressure to the respective working sections depending on an operation position of a shift level installed in the driver's place, and further through an orifice 133. An adjustment accumulator 143 is connected to the oil pressure path such that it diverges therefrom through an orifice 142. The accumulator 143 shown in FIG. 9 has a piston 145 and a spring 147, and functions such that a predetermined oil pressure defined by the spring 147 is maintained for a predetermined period of time when oil is supplied to the forward clutch C1, whereby the forward clutch C1 is maintained in an engaged state.

Figure 10:
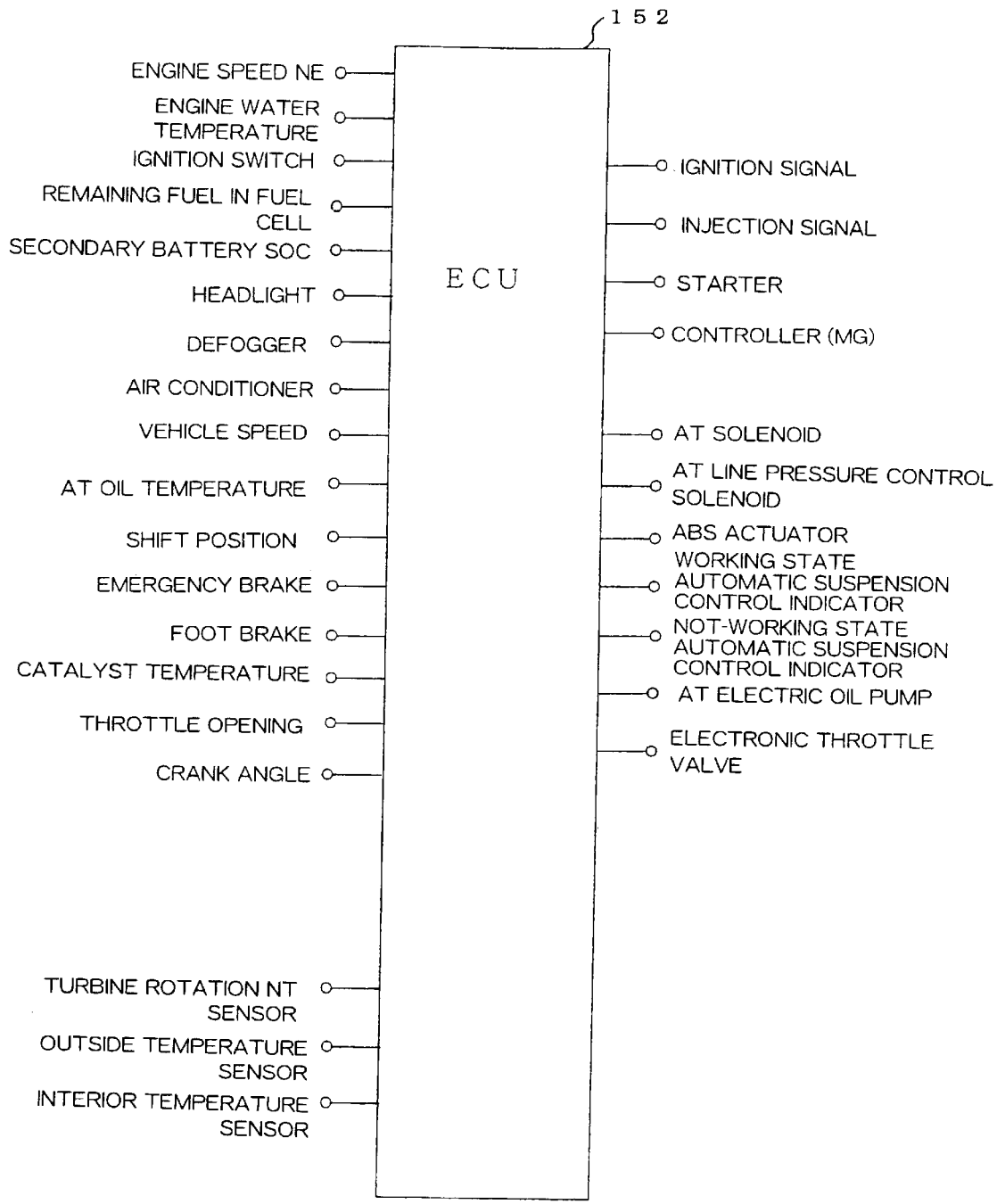
FIG. 10 is a block diagram showing types of input/output signals with respect to a controller.

Referring to FIG. 10, the controller 152 is configured in the form of a one-chip microprocessor with the CPU serving as a main element, comprising a ROM for storing process programs, a RAM for temporarily storing data, a communication port for communicating with a controller and so forth, and input and output ports, all not shown.

The controller 152 has various sensors connected thereto. That is, an input side of the controller 152 is connected to an engine speed sensor and an engine water temperature sensor, both mounted to the engine 112, an ignition switch provided in the interior of the vehicle room, a remaining amount sensor for detecting an amount of fuel remaining in a fuel cell, an SOC sensor provided to a secondary cell, accessories including a head light, a defogger, and an air conditioner, a vehicle speed sensor mounted to a driving wheel, an AT oil temperature sensor provided to an automatic transmission, a shift position sensor mounted to a base of a shift lever, an emergency brake position sensor mounted to an emergency brake lever, a brake pedal sensor mounted to a brake pedal, a catalyst temperature sensor incorporated into an exhaustion pipe, a throttle opening sensor provided to a throttle valve actuator, a crank angle sensor mounted to a crank shaft, a rotation sensor provided to a turbine, and an outside temperature sensor, an interior temperature sensor, and so forth, and receives detection values from these sensors.

An output side of the controller 152 is connected to an ignition device, a fuel injection system, controllers for controlling operations of the starter 111 and the auxiliary motor-generator 130, an AT solenoid for controlling an oil pressure control circuit of the gear transmission section 122, an AT line pressure control solenoid 137, an ABS actuator, an working state automatic suspension control indicator and a not-working state automatic suspension control indicator, both installed in the interior of the vehicle room, a relay for a driving motor of the electric oil pump 40, an electronic throttle valve, and so forth, and outputs actuation signals to the various devices.

In the thus constructed vehicle according to a second embodiment, the controller 152 applies eco-run control depending on the vehicle state. The engine 112 is automatically suspended when the following conditions are held, for the shift lever in N-position or P-position, "a vehicle speed zero (the vehicle is stopped)" AND "acceleration off (accelerator pedal not depressed), and, for the shift lever in D-position, "a vehicle speed zero" AND "acceleration off" AND "brake on (a brake pedal depressed). In addition, preferably, the condition may include "an idle switch off", "a predetermined or larger SOC value", "a predetermined or higher outside temperature", "a predetermined or higher engine water temperature", and so forth.

Whether or not the vehicle speed is zero is determined based on a detection value of the vehicle speed sensor. A state of stepping the acceleration and brake pedals is determined based on various position signals detected by an accelerator pedal position sensor and a brake pedal sensor. The engine 112 is automatically activated when any the automatic suspension condition or conditions no longer apply.

Automatic suspension of the engine 112 is applied by suspending fuel injection and suspending power feeding to the ignition plague, while reactivation of the engine 112 is applied by resuming these suspended operations and also driving the auxiliary motor-generator 130. The eco-run control is applied, for example, when a vehicle 112 running in a city area stops at a crossing, waiting for a signal to change, to improve fuel consumption and reduce emission.

Figure 11:
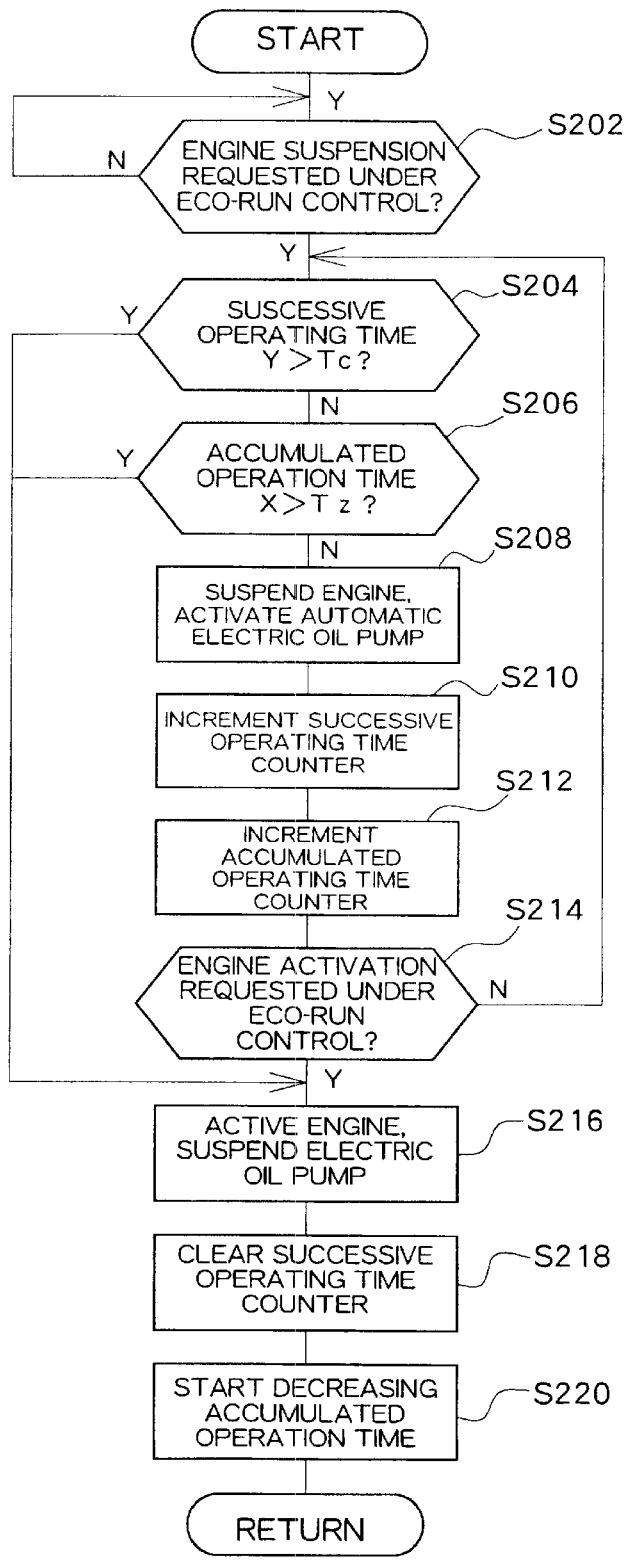
FIG. 11 is a flowchart of control according to the second embodiment.

The above-structured vehicle 110 applies following control when engine suspends or activates. FIG. 11 shows a flowchart showing an example control routine to be executed by the controller 152. This routine is repetitively conducted for every predetermined period of time after an ignition key, not shown, is turned on.

Initially, whether or not the controller 152 has requested the engine 112 to suspend operating under the above-described eco-run control is determined based on various input signals (S202). This determination is repetitively made while no such request is made.

When it is determined that such a request has been made, a counter value Y of a successive operating time counter, described below, is read out, and whether or not the read counter value is in excess of a predetermined standard value Tc is determined (S204). In addition, a counter value of an accumulated operation time counter, described below, is also read out, and whether or not the read counter value X is in excess of a predetermined standard value Tz is determined (S206). When neither determination is positive, the process proceeds to S208.

In response to a request to suspend operation of the engine 112 as described above, a suspension request to the engine 112 and an activation request to the electric oil pump 140 are output, respectively (S208). Specifically, the suspension request to the engine 112 is made by discontinuing fuel supply and halting ignition, and the activation request to the electric oil pump 140 is made through operation of a relay for a driving motor of the electric oil pump 140. It should be noted that earlier output of a signal to the electric oil pump 140 to prompt the electric oil pump 140 to activate prior to suspension of the engine 112 is preferred as supply of a working oil can be continued by the electric oil pump 140 to ensure oil pressure.

Thereafter, a counter value of the successive operating time counter is incremented (S210). The successive operating time counter is a software counter set in the controller 152 and tasked to detect an amount of time of each operation of the electric oil pump 140.

In addition, a counter value of the accumulated operation time counter is incremented (S210). The accumulated operation time counter is a software counter similarly set in the controller 152 and tasked to count an accumulated operation time which counts an amount of time of each operation and reflects past operation and suspension of the electric oil pump 140.

Figure 12:
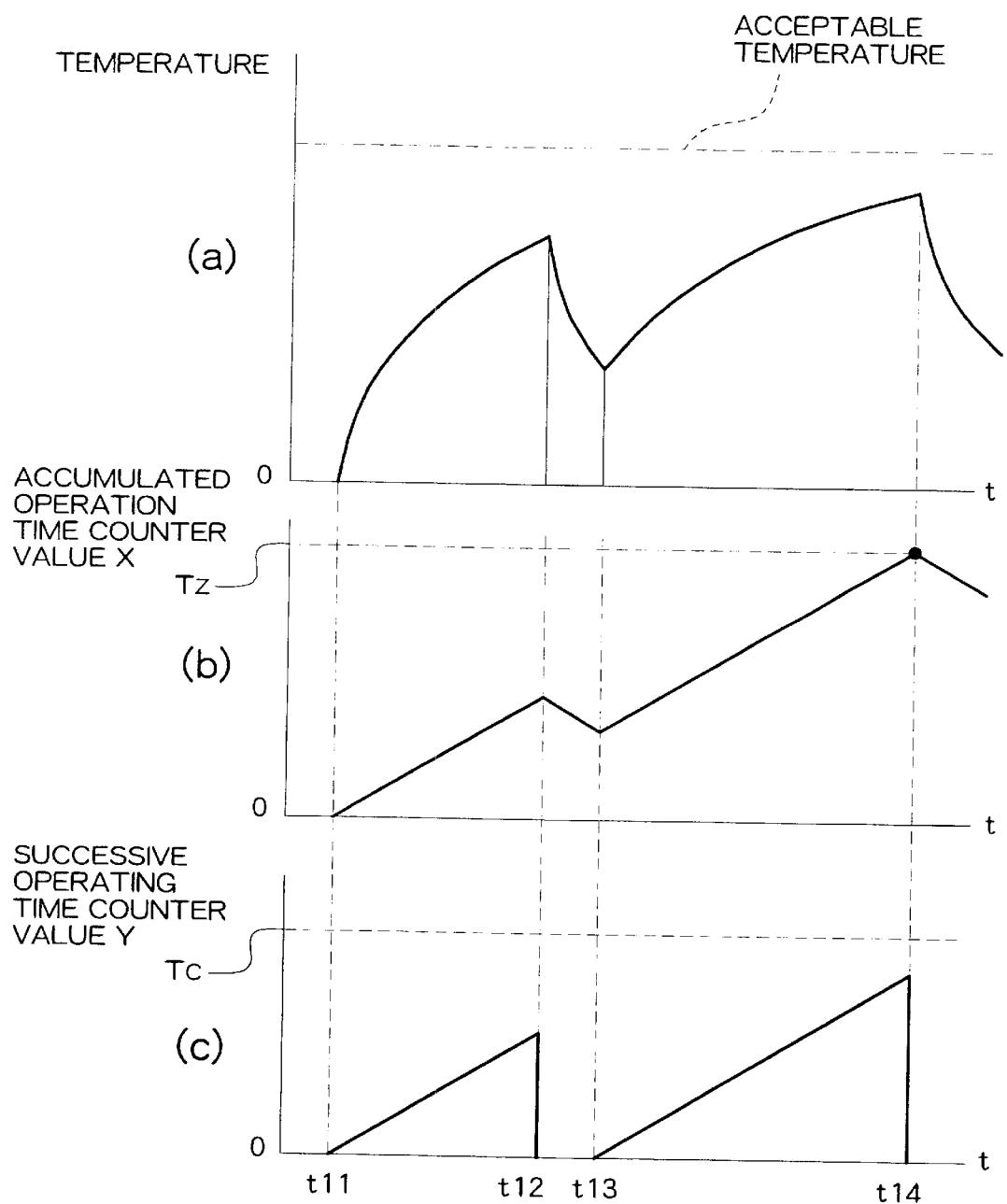
FIG. 12 is a graph illustrating a relationship between (a) a temperature of a driving motor of an electric oil pump, (b) a counter value of an accumulated operation time counter, and (c) a counter value of a successive operation counter, in an operation according to the second embodiment.

The accumulated operation time is obtained by subtracting at a constant rate an amount of time having elapsed after suspension of operation of the electric oil pump 140 from each operation time of the electric oil pump 140 and, after activation of the electric oil pump 140, then by adding at a constant rate to the resultant operation time at the activation, an amount of time having elapsed from the activation, that is, an operation time. That is, this calculation of an accumulated operation time corresponds to application of correction based on an operation history to an operating time for every operation. As a result, the accumulated operation time changes substantially according to the temperature of a driving motor which drives the electric oil pump 140, as shown in FIG. 12.

Processes at S204 to S212 are repetitively applied until the controller 152 requests the engine 112 to activate operation (S214) Therefore, counter values of the successive operating time counter and the accumulated operation time counter continue increasing at a constant rate until the activation request is made.

When either the counter value Y of the successive operating time counter exceeds a standard value Tc (S204) or the accumulated operation time counter exceeds a standard value Tz (S206), the process jumps to S216, where an activation request to the engine 112 and a suspension request to the electric oil pump 140 are output, respectively (S216). Specifically, an activation request to the engine 112 is made by resuming fuel injection and power feeding to the ignition plague and also by controlling the driving relay of the auxiliary motor-generator 130. In addition, the counter value of the successive operating time counter is cleared to 0 (S218).

These standard values Tz, Tc are determined based on an acceptable temperature which is determined in consideration of durability of a brush of the driving motor of the electric oil pump 140 and a welded portion of the driving circuit which feeds power to the driving motor.

Thereafter, the counter value of the accumulated operation time counter is made to begin decreasing (S220). The decrease is achieved through subtraction at a constant rate relative to the counter value of the accumulated operation time counter, and continued until the counter value becomes zero or next increment of the counter value of the accumulated operation time counter (S212) is resumed.

When an activation request under eco-run control is made to the engine 112 (S214) before the counter value Y of the successive operating time exceeds the standard value Tc (S204) and the counter value of the accumulated operation time counter exceeds the standard value Tz (S206), the process proceeds to S216.

With application of the above processes, the temperature of the driving motor of the electric oil pump 140, for example, the temperature of the brush, will change as shown in FIG. 9. Specifically, when operation of the engine 112 is suspended and operation of the electric oil pump 140 accordingly begins at t11, the temperature of the driving motor increases according to a predetermined saturation curve. When operation of the electric oil pump 140 is suspended at time t12 in response to a suspension request to the electric oil pump 140, which accompanies an activation request to the engine 112 resulting, for example, from driver operation of the accelerator pedal, the temperature of the driving motor begins to fall.

When the electric oil pump 140 resumes operating in response to an activation request to the electric oil pump 140, which, for example, follows a suspension request to the engine 112, the temperature of the driving motor accordingly begins to increase. When the counter value X (FIG. 9) of the accumulated operation time counter reaches a standard value Tz (t14), the engine 112 is activated, and the electric oil pump 140 is suspended (S216) Therefore, the temperature of the driving motor begins dropping again without reaching an acceptable temperature, that is, an acceptable temperature determined in consideration of the durability of the brush of the driving motor and of a welded portion of the driving circuit which feeds power to the driving motor.

As described above, in the second embodiment, a successive operating time of the electric oil pump 140 is corrected based on an operation history through calculation and utilization of an accumulated operation time. This achieves appropriate driving in consideration of an operation history of the electric oil pump 140.

Further, in the second embodiment, as an operation history which bases the determination of an amount of correction to be applied to a successive operating time of the electric oil pump 140, the elapsed from completion of the last operation of the electric oil pump (in FIG. 9) is utilized and the counter value of the accumulated operating time counter is subtracted at a constant rate based on the elapsed time. This makes it possible to correct the successive operating time of the electric oil pump 140 according to a time having elapsed from completion of the last operation. As a result, appropriate driving in consideration of a drop in temperature after completion of the last operation can be achieved.

Still further, in the second operation, information concerning the last operation of the electric oil pump 140, in particular, the temperature of the driving motor at the time of completion of the last operation, is obtained based on an operation time and an amount of correction to be applied to the successive operating time is corrected based on the last operating time. This makes it possible to approximately detect a temperature change of the driving motor, achieving appropriate driving in consideration of an increase of the temperature of the electric oil pump 140 at the last operation.

It should be noted that, in addition to the example structure of the second embodiment in which counter values of the successive operating time counter and the accumulated operation time counter are used intact, another structure may be usable, such as one in which a counter value is corrected using a predetermined function to attain more precise approximation of the driving motor temperature. Alternatively, in order to reflect, in estimation of the temperature of the driving motor, detection values from an oil temperature sensor provided to the fluid pressure controller 124, an engine water gauge, an engine oil temperature sensor provided to the engine, an outside temperature sensor desirably installed to the vehicle, and an engine room temperature sensor installed in the engine room, correction may be applied to the counter values of the respective counters using a predetermined function based on these detection values. As a further alternative, the correction may be applied to the counter values using a predetermined map or table.

In addition to the example structure of the second embodiment in which recent operation, such as the last two operations, are considered, a structure in which all operations having been executed throughout the life of the driving motor of the electric oil pump 140 up to the present are considered may be employed. For example, it is possible to construct such that a lower value is set for a standard value which defines an upper limit of a successive operation time of the electric oil pup 140, during a predetermined initial adaptation operation period during which the driving motor may need running-in, or a certain period of time near the end of the life of the driving motor during which an acceptable temperature may possibly drop due to obsolescence. Such structures are also included in the scope of the present invention.

Further, in addition to the example structure of the second embodiment in which a successive operating time is corrected based on accumulated operation time, another structure may also be applicable to produce the same advantage. For example, a structure in which an acceptable operation time is changed based on an accumulated operation time may be employed. For example, a lower standard value Tc for the successive operating time counter may be set for a higher counter value of the accumulated operation time counter.

Still further, although the mechanical oil pumps 36, 136 which are driven by a mechanical output from a driving source including the engines 12, 112 or the motor-generator 14 are used in the above embodiments, the mechanical oil pumps 36, 136 may be substituted by, for example, an electric oil pump, serving as a first pump, which is driven by electric power from a fuel cell, and the first electric oil pump may be used while being desirably switched with the second electric oil pump 140.

Yet further, although the electric oil pumps 40, 140 which are driven by power from a driving motor are used in the above embodiments, the second pump in the present invention is not limited to a pump which is driven by power of a driving motor but any electric power-driven pump having a different structure may be employed. For example, an oil pump which is driven by an output shaft of the auxiliary motor-generator 130 may be employed.

Yet further, although an example in which the present invention is incorporated into a vehicle 10, 110 which switches two pumps to supply oil pressure to a hydraulic mechanism in a power transmission system, namely, the transmission devices 18, 118 and the torque converters 20, 120 is referred to in the above description of the present invention, the present invention may be applied to a vehicle in which two pumps are switched to supply oil pressure to a hydraulic mechanism in a system other than a power transmission system, for example, an ABS, a Vehicle Stability Control System, or VSC, a power steering system, and so forth.

Yet further, although examples in which the present invention is incorporated into a hybrid vehicle which switches power from the engine 12 and the motor-generator 14 (the first embodiment) and a vehicle which has an engine 112 alone and utilizes automatic suspension and automatic activation of the engine 112 (the second embodiment) are referred to in the above description of the present invention, application of the present invention is not limited to such vehicles and the present invention can be applied to other vehicles. For example, a vehicle which operates using only a motor-generator is also included in the scope of the present invention.

The present invention can be preferably utilized as an electric oil pump control device in a vehicle which effects activation and suspension of operation of a driving source such as an engine and a motor while the vehicle is running.

What is claimed is:

1. An electric oil pump control device, comprising:
   a driving source;
   a driving source controller for activating and suspending operation of the driving source under a predetermined condition;
   a first pump;
   a second pump driven by electrical energy;
   a pump controller for operating the second pump when the first pump is not operating; and a hydraulic mechanism driven by oil pressure supplied from the first pump and the second pump, wherein the pump controller causes the second pump to operate until a successive operating time of the second pump exceeds a predetermined acceptable operation time, and the driving source controller activates the driving source when the successive operating time of the second pump exceeds the acceptable operation time.

2. An electric oil pump control device, comprising:

a driving source;

a driving source controller for activating and suspending operation of the driving source under a predetermined condition;

a first pump;

a second pump driven by electrical energy;

a pump controller for operating the second pump when the first pump is not operating; and a hydraulic mechanism driven by oil pressure supplied from the first pump and the second pump, wherein the pump controller causes the second pump to operate until a successive operating time of the second pump exceeds a predetermined acceptable operation time, and the acceptable operation time is set according to a measured value of physical property indicative of a state of the vehicle.

3. An electric oil pump control device, comprising:

a driving source;

a driving source controller for activating and suspending operation of the driving source under a predetermined condition;

a first pump;

a second pump driven by electrical energy;

a pump controller for operating the second pump when the first pump is not operating;

a hydraulic mechanism driven by oil pressure supplied from the first pump and the second pump; and a prediction device for making a running prediction according to a state of the vehicle, wherein the pump controller causes the second pump to operate until a successive operating time of the second pump exceeds a predetermined acceptable operation time, and the acceptable operation time is set according to the running prediction.

4. The control device according to claim 3, wherein the running prediction is a prediction based on a running state of the vehicle, and is a prediction concerning automatic activation of the driving source or a prediction concerning termination of operation of the vehicle.

* * * * *